United States Patent [19]

Anderson et al.

[11] 4,042,926
[45] Aug. 16, 1977

[54] AUTOMATIC TRANSPONDER

[75] Inventors: Roy E. Anderson, Schenectady; Alex F. Brisken, Ballston Lake; James R. Lewis, Schenectady, all of N.Y.

[73] Assignee: The United States of America as represented by the Administrator of the National Aeronautics and Space Administration, Washington, D.C.

[21] Appl. No.: 562,499

[22] Filed: Mar. 27, 1975

[51] Int. Cl.² .............................................. G01S 7/40
[52] U.S. Cl. .................................................. 343/17.7
[58] Field of Search ...................................... 343/17.7

[56] References Cited

U.S. PATENT DOCUMENTS

| 2,604,622 | 7/1952  | Hasbrook   | 343/17.7   |
| 3,728,728 | 4/1973  | Vogel et al. | 343/17.7 |
| 3,803,607 | 4/1974  | Robinson   | 343/17.7   |
| 3,919,708 | 11/1975 | Pudsey     | 343/17.7 X |

*Primary Examiner*—Malcolm F. Hubler
*Attorney, Agent, or Firm*—John R. Tresansky; Jerome C. Squillaro; John R. Manning

[57] ABSTRACT

A method and apparatus for the automatic, remote measurement of the internal delay time of a transponder at the time of operation is provided. A small portion of the transmitted signal of the transponder is converted to the receive signal frequency of the transponder and supplied to the input of the transponder. The elapsed time between the receive signal locally generated and the receive signal causing the transmission of the transmitted signal is measured, said time being representative of or equal to the internal delay time of the transponder at the time of operation.

11 Claims, 9 Drawing Figures

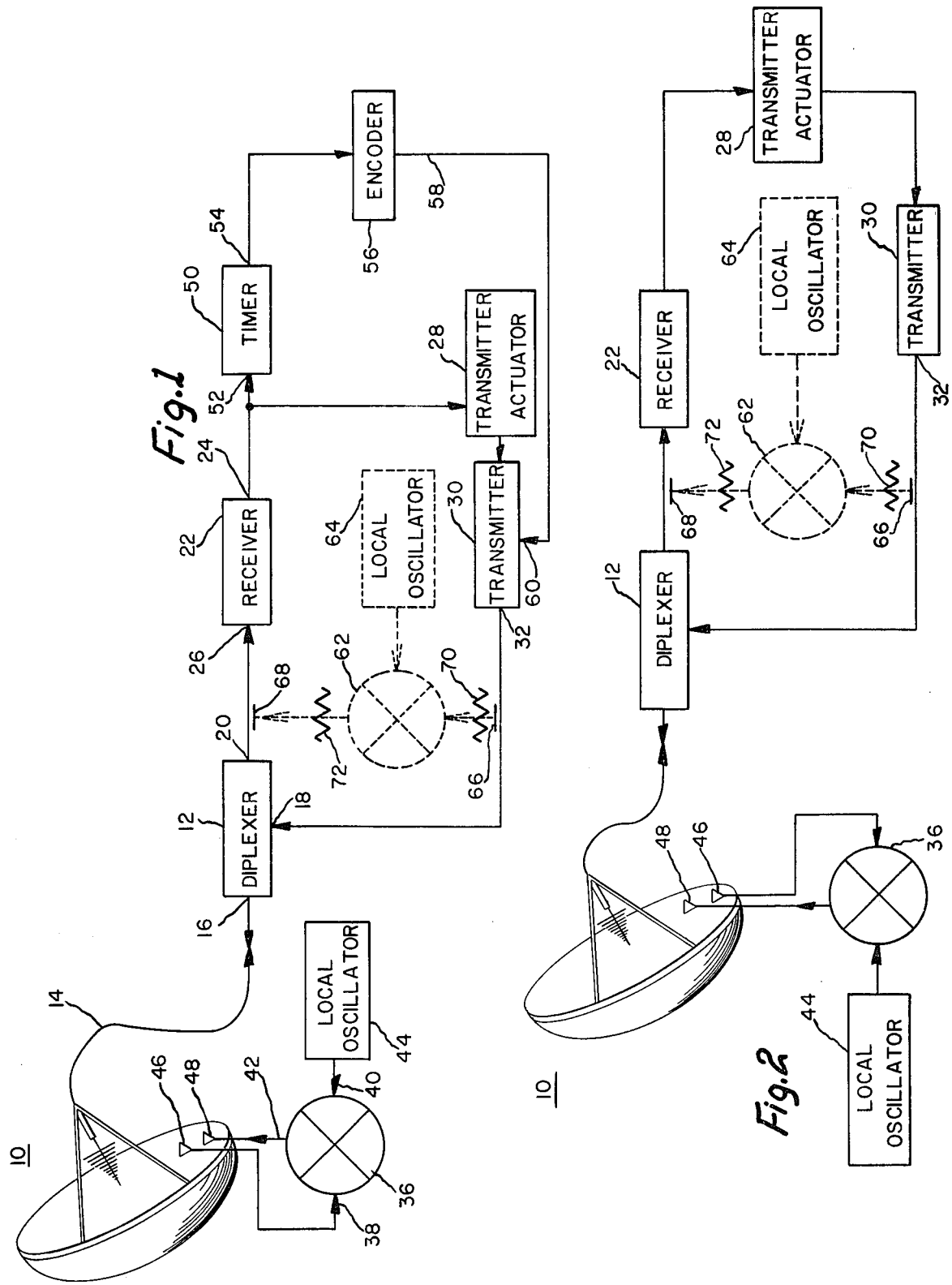

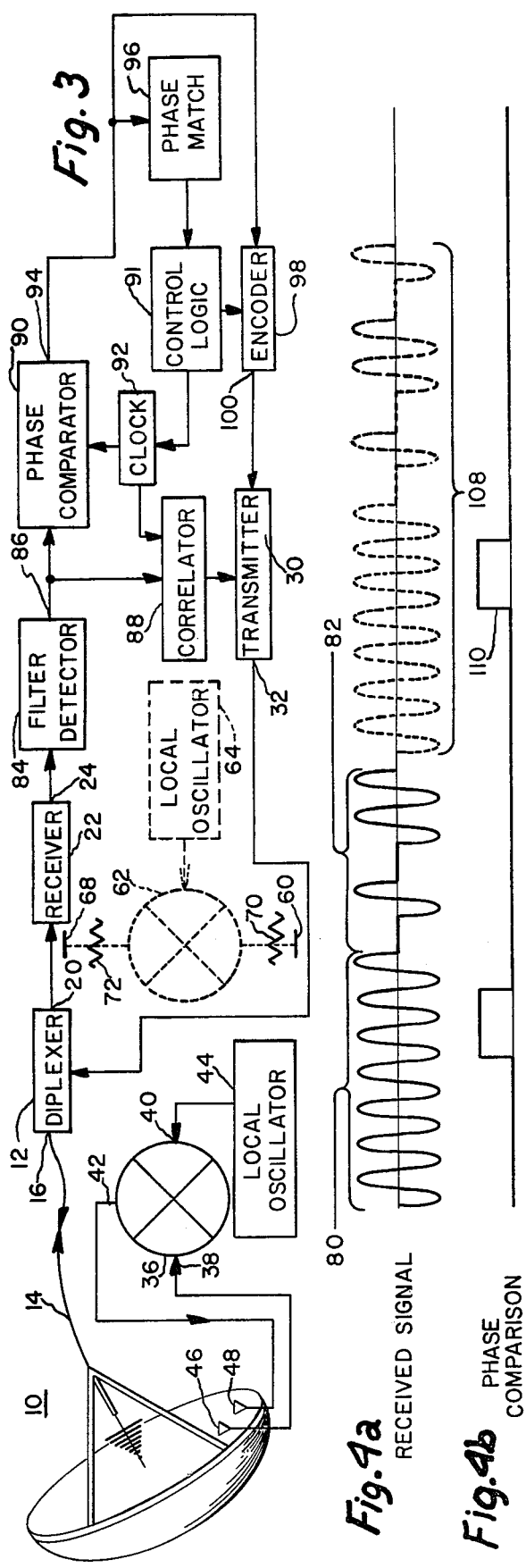

ic signal is used to
actuate the transponder transmitter to generate a trans-

AUTOMATIC TRANSPONDER

This invention relates, in general, to automatic transponders of the type suitable to be utilized in non-attended, remotely located applications as, for example, might be necessary in satellite ranging systems, and more particularly to a method and apparatus for providing automatic, remotely readable measurement of the internal delay time of a transponder of the type hereinabove described.

Automatic transponders are becoming increasingly important for location and ranging measurements. The use of earth orbiting satellites makes possible global ranging and locating systems. For example, three earth stations at known locations can precisely locate a satellite in earth orbit. Similarly, an earth station given a known location in combination with two satellites whose locations are also known can precisely locate a transponder equipped ship, for example, on the earth's surface. An earth station and three satellites similarly can precisely locate a transponder equipped airplane, again by way of example, in the air.

In order to reduce the requirement for manned stations, it is a desirable practice to provide remotely located transponders having the capability to receive a radio frequency signal from a satellite, and transmit back data necessary for ranging measurements. The use of individual access codes makes possible the dissemination of a number of such transponders which can be individually accessed by a single earth station. A system of this type permits a single manned station to make precise satellite ranging measurements. Similarly, unmanned transponders may be placed aboard ships, for example, allowing unattended and frequent location measurements to be made by shore stations without the active assistance of ship's personnel.

In order to obtain a high degree of accuracy from ranging techniques of the type hereinabove described, it is necessary to determine precisely the transit times of signals sent from an earth station to a satellite then to another earth station and back to the satellite and finally to the first earth station. This invention is specifically addressed to the problem of precisely determining the time delay due to the passage of a radio frequency signal through an automatic transponder. While the time delay through a transponder of the type with which this invention is concerned may be locally measured with satisfactory accuracy, various considerations may combine to change the delay after the transponder is installed in its permanent location. For example, as is well known, temperature and humidity as well as aging tend to affect the values of electronic components. Similarly, the adjustment of tuned circuits tends to vary the time delay of signals propagated therethrough. While in many applications delays of the type hereinabove mentioned may be of minimal importance, in ranging and location measuring systems of the type hereinabove described, small changes may produce intolerable diminutions in precision of measurement. This invention provides a method and apparatus for remotely determining the delay time of a transponder at the time that it is actuated.

Briefly stated and in accordance with one aspect of this invention, a method and apparatus for determining the internal time delay of a transponder of the type wherein a received radio frequency signal is used to actuate the transponder transmitter to generate a transmit radio frequency signal in response to the receive radio frequency signal, includes means for locally generating a second receive radio frequency signal in response to the transmitter output signal, which second locally generated receive radio frequency signal is applied to the transponder receiver.

In one embodiment of this invention, this second receive signal is permitted to generate a second transmit signal which will be delayed in time from the first transmit signal by an amount equal to the internal time delay of the transponder. In a second embodiment of this invention, the time between the first received signal and the second locally generated received signal is measured and transmitted to the remote sending station.

The features of the invention which are believed to be novel are pointed out with particularity in the appended claims. The invention itself, however, both as to its organization and method of operation together with further objects and advantages thereof may best be understood by reference to the following description taken in connection with the accompanying drawings in which:

FIG. 1 is a block diagram representation of an automatic transponder in accordance with one embodiment of this invention.

FIG. 2 is a block diagram representation of an automatic transponder in accordance with another aspect of this invention.

FIG. 3 is a detailed block diagram of an automatic transponder in accordance with this invention.

FIGS. 4a –4b is a timing diagram of the sequence of operations of the transponder of FIG. 3.

While the specific techniques employed may vary depending upon the particular type of ranging or location determining requirements of the system, the fundamental measurement used in substantially all satellite ranging and locating techniques is the determination of the propagation time of a radio frequency signal from a first earth station through a satellite repeater to a remotely located transponder, back through the satellite repeater and to the earth station. By measuring the total propagation time, the distance from the earth station to the satellite and finally to the remotely located transponder may be determined insofar as the propagation velocity is known. It is clear that the time during which the radio frequency signal is delayed in passing through the satellite repeater and also through the remotely located transponder must be subtracted from the total transit time in order to accurately determine the distance. The precision with which the internal delay times of the satellite and transponder may be determined directly affect the precision with which the range may be measured. Generally speaking, it may be said that the delay time of a radio frequency repeating device is inversely related to the bandwidth of the device. For example, a device having a relatively large bandwidth will have a shorter internal delay time than a similar device having a narrow bandwidth. Satellite repeaters may be considered to have relatively large bandwidths compared to other elements of a ranging system of the type with which this invention is concerned.

It may also be noted that in addition to the relatively large bandwidth, and associated short internal time delay of a satellite repeater, the environment of such a satellite repeater is relatively stable. The stability of the environment makes possible accurate prediction of the actual time delay of a satellite in orbit based upon measurements of that time delay prior to launch. Variations, if any, on the calculated internal delay time of the satellite repeater are known to be small compared to the delays and the variations in delay to be found in automatic transponders. While it is pointed out that it may be convenient to estimate or ignore the internal time delays of satellite repeaters, especially with respect to presently existing satellites, this invention is well suited to incorporate into subsequently constructed satellites for the remote measurement of the internal delay time thereof.

While transponders may take a variety of forms depending upon the particular ranging technique utilized, they exhibit delays which may be conveniently placed in several categories. These categories are based as aforementioned on the relative bandwidth of the relevant equipment. For example, a typical transponder may comprise a relatively high frequency, wide bandwidth receiver adapted to receive signals from a high gain direction antenna. The delays associated with a receiver of this type are relatively short and therefore the variations to be found due to environmental and tuning parameters, for example, are short. The receiver may conveniently include a lower frequency IF (intermediate frequency) portion of substantially lesser bandwidth. The time delays and variations therein associated with the IF portion of the receiver will be relatively greater than the higher frequency portions. Similarly, variations due to tuning and environmental parameters are increased. Following the IF portion of the receiver will normally be found selective audio frequency circuits and signal processing and timing circuits, the nature of which will depend upon the particular ranging method utilized. One such ranging method and the circuits associated therewith will be more completely described below. Insofar as the bandwidth of the audio frequency circuits is the narrowest bandwidth of the transponder system, the delays associated therewith are the longest and the variations to be found due to tuning and environmental considerations are the most severe.

FIG. 1 shows a block diagram schematic of an automatic transponder in accordance with one aspect of this invention. While this invention will be specifically described in terms of a satellite ranging system, it is to be understood that it may be equally advantageously practiced in any system, as for example, terrestrial ranging, e.g., radar ranging systems. An antenna 10 which while illustrated as a parabolic reflector, is understood to include any antenna suitable for satellite communications as are well known to those skilled in the art, as, for example, but not limited to yagi antennae, helical antennae, and various type of phased array antennae. Antenna 10 is typically connected to a diplexer 12 through a transmission line 14. Diplexer 12 allows the antenna 10 to be used simultaneously for transmitting and receiving radio frequency signals. Alternatively, discrete transmit and receive antennae may be utilized. Diplexer 12 is provided with a first input/output port 16 connected to transmission line 14, and input port 18 and an output port 20. A receiver 22 is shown connected to output port 20 and is intended to include all of the aforementioned receiver functions including a high frequency portion, an intermediate frequency portion and an audio frequency portion. Where desirable, receiver 22 may include means for identifying a desired signal, and discriminating between desired signals and undesired signals or noise. Typically receiver 22 produces an output at output port 24 thereof in response to a desired signal at input 26. Output 24 of receiver 22 is connected to transmitter actuator 28. The precise function of transmitter actuator 28 depends upon the particular mode of operation of the transponder. For example, transmitter actuator 28 may include a specific fixed time delay, or means for generating a code specifically identifying the transponder which is interrogated, alternately, the transmitter may be continuously actuated, as in the "full duplex" mode. The embodiment of FIG. 1 requires only that transmitter actuator 28 provide a keying, or "turn-on" signal to transmitter 30 in response to output 24 of receiver 22. Transmitter 30 therefore is energized whenever an output is produced at output 24 of receiver 22 in response to a desired signal. Output 32 of transmitter 30 is connected to input 18 of diplexer 12 and then through transmission line 14 to antenna 10. The transponder as hereinabove described is conventional. As has been discussed, supra, there will be a finite delay time between the reception of a signal at antenna 10 and the ultimate transmission of a response therefrom. Additionally, as is well known, environmental and adjustment, as for example tuning, considerations will introduce variations in this delay time. In order to remotely measure this delay time, mixer 36 is provided having inputs 38 and 40 and an output 42. Input 40 is connected to local oscillator 44, while input 38 and output 42 are connected to antennae 46 and 48, respectively, located in close proximity to antenna 10. A small portion of the transmit signal generated by the transponder is received at antenna 46 and applied to input 38 of mixer 36 wherein it is converted, as is well known, to the receive frequency of the transponder. The frequency of local oscillator 44 is, accordingly, chosen to be equal to the sum of the difference of a receive and transmit signal frequencies. As the signal level present at antenna 46 will be large due to the close proximity thereof to the antenna 10, it is unnecessary to provide a high degree of selectivity in mixer 36. Therefore, the bandwidth of mixer 36 can be made fairly wide and the time delay associated therewith very short. It is preferable that mixer 36 be designed to have a time delay which is sufficiently short with respect to the time delays of the transponder as hereinbefore described that they contribute thereto in negligible quantity.

In operation, a transmit signal appearing at antenna 10 will generate, effectively instantaneously, a second receive signal which will appear to the transponder as a duplicate of the transmitted signal at the transponder receive frequency. This second receive signal will be processed by the transponder in a manner identical to that hereinbefore described for the first received signal. In order to provide a means for measuring the time delay between the reception of the first receive signal and the generation of the transmit signal in response thereto, it is necessary to provide a timer. In accordance with one embodiment of this invention, a timer 50 is provided having an input 52 connected to the output 24 of receiver 22. Timer 50 is started in response to a first output appearing at output port 24 of receiver 22 which first output is generated in response to a first received signal which signal would, in the normal mode of operation, be the interrogating signal received at antenna 10. As was hereinbefore described, the output appearing at output port 24 is also applied to transmitter actuator 28 to generate a transmit signal. A second received signal is then generated at antenna 48 which second received signal is delayed from the first received signal by the time delay of the transponder plus the time delay of mixer 36. The second received signal is processed in a manner identical to the first and creates a second output at output port 24 of receiver 22. The second output is utilized to stop timer 50 the elapsed time between the start and stop of timer 50 being equal to the delay time of the transponder plus the delay time of mixer 36. As was hereinabove described, the delay time of mixer 36 is so short as compared to the delay time of the transponder as to be negligible. Timer 50, therefore, provides an indication of the delay time of the transponder at the time it is interrogated. Output 54 of timer 50 is applied to encoder 56 which converts the elapsed time to a form convenient to be transmitted by transmitter 30. For example, a serially encoded digital signal may be used. Output 58 of encoder 56 is connected to input 60 of transmitter 30. As the output appearing at output port 24 of receiver 22 due to the second, locally generated, received signal is also applied to transmitter actuator 28, transmitter 30 will be keyed and an encoded signal indicative of the elapsed time delay of the transponder at the time of use will be transmitted. As this second transmitted signal will also be applied to input antenna 46 of mixer 36, it is necessary to provide means for preventing a third received signal from actuating transmitter 30. This may be accomplished in a variety of ways, as for example, but not limited to inhibiting the generation of a second signal by mixer 36 by turning off mixer 36 for a predetermined period after the generation of the first signal thereby. Alternately, it is possible to provide a counter in transmitter actuator 28 which allows only two received signals to key transmitter 30 in a preselected time. This preselected time should be large enough to include the time delay of the transponder, but small enough to permit successive interrogation thereof as is desired.

In accordance with another embodiment of this invention and as an alternative to the placement of mixer 36 and its associated antenna at the antenna 10 as hereinabove described, a mixer 62 may be placed between output 32 of transmitter 30 and input 26 of receiver 22 as illustrated in phantom at FIG. 1. Local oscillator 64 performs the same function as local oscillator 44 hereinabove discussed. It can be seen that the placement of mixer 62 as shown in phantom in FIG. 1 will produce a mode of operation similar to that described for mixer 36. The elapsed time measured by timer 51 using mixer 62 and local oscillator 64 in the circuit location illustrated will differ from that obtained through the use of mixer 36 and local oscillator 44 with the associated antennae located at antenna 10. It can be seen that the mixer and local oscillator configuration shown in phantom will produce an elapsed time which does not include the time delay in transmission line 14 and diplexer 12. The location illustrated in phantom offers certain advantages, however, it will be appreciated that certain economies will be realized by eliminating the need for antennae 46 and 48 associated with mixer 36 which are not needed when mixer 62 and local oscillator 64 are connected as illustrated. As was hereinbefore described the delays associated with transmission line 14 and diplexer 12 are relatively short compared with those associated with receiver 22, transmitter 30, and transmitter actuator 20 depending upon the particular configuration thereof. Further, it is to be appreciated that the changes in delays associated with transmission line 14 and diplexer 12 are smaller still and that since the fixed delay at a given set of environmental and tuning parameters may be easily measured on a "one time" basis only the ability to measure changes in delay is sacrificed. Conveniently, mixer 62 is provided with input and output sampling devices 66 and 68 of the type well known to those skilled in the art, for example, tapped transmission line sections. Additionally, optional attenuators 70 and 72 may be provided to insure proper input and output signal levels to mixer 62 and receiver 22.

FIG. 2 is a block diagram schematic of an automatic transponder having means for remotely determining the delay time thereof at the time of operation in accordance with another embodiment of this invention. The functions of diplexer 12, receiver 22, transmitter actuator 28, and transmitter 30 are substantially similar to those hereinbefore described in conjunction with FIG. 1. Similarly, mixer 36 and local oscillator 44, along with associated sampling antennae 46 and 48 which antennae are located in close proximity to antennae 10 are substantially identical to the like numbered elements as hereinbefore described in conjunction with FIG. 1. The automatic transponder of FIG. 2 is somewhat simpler than that of FIG. 1 in that timer 50 and encoder 56 are eliminated. Transmitter actuator 28 in addition to its normal function of keying transmitter 30 in response to a desired output signal from receiver 22 includes the additional function of allowing two and only two repetitive keyings of transmitter 30 within a predetermined time which is longer than the internal time delay of the transponder yet sufficiently short to permit repetitive interrogations thereof as desired. In operation, the transponder of FIG. 2 detects a first received signal arriving at antenna 10, passing through diplexer 12 to receiver 22 which provides a signal to transmitter actuator 28 which, in turn, keys transmitter 30 generating a first transmit signal at the output thereof which is passed through diplexer 12 and finally to antenna 10 where it is transmitted. Mixer 36 detects the first transmitted signal at antenna 48 thereof which antenna is preferably located as close as possible to antenna 10 to minimize the propagation therebetween. As was hereinbefore described, the detected first transmit signal is heterodyned to the receive frequency of the transponder and applied to antenna 48 again located as close as possible to antenna 10 where it is received as a second receive signal. This second receive signal generates a second transmit signal as hereinbefore described which is transmitted via antenna 10. The time between the first and second transmit signals which may conveniently be measured at any easily identifiable point therein is equal to the delay time of the transponder plus the delay time of mixer 36 which as hereinbefore described is considered to be negligible. The time between the first and second transmit signals can be measured by any convenient means at the originating station of the ranging system. Mixer 62 and local oscillator 64 along with associated sampling devices 66 and 68 and attenuators 70 and 72 of FIG. 2 provide an alternative mixing function identical to that hereinabove described in conjunction with FIG. 1.

FIG. 3 is a block diagram of an automatic transponder in accordance with yet another embodiment of this invention. Diplexer 12, receiver 22, transmitter 30, mixer 36 and local oscillator 44 perform functions similar to those performed by the like numbered elements in FIGS. 1 and 2 hereinabove described. Similarly, local oscillator 64 and mixer 62 shown in phantom along with associated sampling devices 66 and 68 and attenuators 70 and 72 shown in phantom perform substantially the same functions as performed by the like numbered elements of FIGS. 1 and 2. In order to most easily understand the operation of the automatic transponder in accordance with FIG. 3, FIGS. 4a –4f illustrate in graphical form the time relationships among the various operations to be performed.

In operation, a first received signal is coupled from antenna 10 through transmission line 14, through diplexer 12 and thence to receiver 22 where it is demodulated, producing an output waveform at output port 20 of receiver 22. While the particular waveform will depend upon the method and system for ranging employed, for purposes of most easily understanding the operation of this invention a typical waveform is illustrated at FIG. 4a. FIG. 4a illustrates a waveform having two distinct portions, a first section 80 comprising a substantially pure sine wave, and a second section 82 comprising a digitally coded sine wave of like frequency and amplitude. FIG. 4a is illustrative only and it is to be understood that in operation a substantially greater number of cycles could make up sections 80 and 82 of the received signal. It is further to be understood that the precise nature of the ranging signal may vary from that illustrated, any modulation technique capable of producing a phase coherent reference signal output being suitable, for example, AM, FM, PSK, etc. as will be hereinbelow described, section 80 will be utilized by the transponder to make certain internal adjustments, and coded section 82 will enable the transponder to selectively respond when desired by a remote sending station. Output port 24 of receiver 22 is connected to filter-detector 84. Filter-detector 84 converts the substantially sinusoidal signal illustrated at FIG. 4a to a square wave signal more appropriately suited to digital signal processing. The input signal illustrated at FIG. 4a retains its characteristic of being divided into a first and second sections, a first section being a reference section and the second section a coded section. Output 86 of filter-detector 84 is applied to correlator 88 and phase comparator 90. Phase comparator 90 also receives a reference waveform from internal clock 92. Output 94 of phase comparator 90 is applied to phase match circuit 96 and encoder 98. The precise nature of the output of phase comparator 90 will depend upon the type of phase comparator chosen. A phase comparator suitable to be used in accordance with this invention need only provide a signal indicative of the phase relationship between the output of filter detector 84 and clock 92 which is suitable to be encoded into a form which can be applied to transmitter 30 for ultimate transmission to the interrogating station. It is further required that phase comparator 94 provide a signal which can be applied to phase matching circuit 96 to allow internal clock 92 to be synchronized with reference portion 80 of the input signal illustrated at FIG. 4a. Referring now to FIG. 4b, it can be seen that the phase comparison is preferably accomplished after a substantial portion of reference waveform 80 has occurred so that any transient effects will have subsided. It is emphasized that while any of a number of well known phase comparison and synchronizing methods may be used, it is preferable, in accordance with this invention, to utilize a phase comparator which measures the difference in phase over a large number of cycles in order to insure an extremely small error. After the phase comparison has been made, phase match circuit 96 applies a correction signal as indicated at FIG. 4c through control and logic circuit 98 to clock 92. This correction signal substantially instantaneously changes the phase of clock 92 to be in phase with incoming reference signal portion 80. It is to be emphasized that clock 92 is not "locked" to input reference signal 80 but rather is made to match the phase of the reference signal at a particular instant in time. The stability of internal clock 92 will insure that, at least for the short term, an internal reference phase is available for a subsequent internal phase measurement as will be hereinbelow described. During the time that phase comparator 90 and phase match circuit 96 are setting the phase of clock 92 to be equal to the phase of reference signal portion 80 control logic circuit 91 inhibits encoder 98 from applying any signal to transmitter 30.

Output 86 of filter-detector 84 is also applied to correlator 88. Correlator 88 further supplied with an in-phase reference clock signal. During data signal portion 82, correlator 88 determines if the address code of the particular transponder is being received. The presence of an extremely accurate in phase reference signal obtained as hereinabove described makes possible correlation with a high degree of accuracy and certainty in time. As indicated at FIG. 4d correlation occurs precisely at the end of coded message portion 82. As correlation occurs, transmitter 30 is turned on by correlator 88 and a first transmit signal as indicated at FIG. 4e is initiated. The character of the transmit signal at FIG. 4f is identical to that of a received signal at FIG. 4a during the first portion thereof. Specifically, a precise number of sinusoidal cycles is transmitted followed by a locally generated digital address code. Substantially simultaneously with the transmission of the output signal illustrated at FIG. 4f, mixer 36 and local oscillator 44 generate as has been hereinabove described in conjunction with FIGS. 1 and 2 a second received signal which passes through antenna 10, diplexer 12 and receiver 22. As the second received signal 108 is identical to the first, it will appear at output 86 of filter-detector 84 and be compared in phase, 110, with the output of clock 92 and phase comparator 90. While clock 92 and input signal portion 80 were set to be in phase as hereinabove described and as can be seen at FIG. 4c, propagation delays in the transmission of the first transmit signal through transmitter 30, diplexer 12, transmission line 14, sampling antenna 46, mixer 36, and back through antenna 48, antenna 10, transmission line 14, diplexer 12, receiver 22, and filter-detector 84 will result in a signal which is lagging in phase behind the reference signal supplied by internal clock 92. The magnitude of the phase difference will be an accurate indication of the time delay undergone by the signal originally present at output 86 of filter-detector 84 which has, in fact, passed through each and every delay producing stage of the transponder. Depending upon the actual frequency of the clock and reference signal portion, the delay may exceed 360°. It is, therefore, preferable that the frequency of reference signal section 80 and therefore of clock 92 be chosen so that the change in delay due to environmental and/or tuning conditions, for example, be less than the period of the waveform. In this way, by making a "one time" only measurement of the delay, the output of phase comparator 90 can be added to or subtracted from to indicate the precise total delay in the transponder. In this way delays exceeding the period of reference signal section 80 may be conveniently measured. As the second phase comparison is made, output 94 of phase comparator 90 which is applied to phase match circuit 96 is inhibited from resetting the phase of clock 92 by control logic circuit 98. Instead, output 94 of phase comparator 90 is allowed to provide an encoded signal at output 100 of encoder 98 which output is applied to transmitter 30. Referring now to FIG. 4f, it is seen that a digitally encoded data stream 106 representing the output of phase comparator 94 is transmitted immediately following the data portion of the transmitted signal illustrated at the FIG. 4f. Referring specifically to FIG. 4f, it can be seen that the output signal comprises a reference portion 102 identical to reference portion 80 of the input signal, a digital address component 104 corresponding to digital address component 82 of the transponder and an additional digital data portion 106 corresponding to the output of phase comparator 90.

While the invention has been particularly shown and described with reference to several preferred embodiments thereof, it will be understood by those skilled in the art that various changes in form and detail may be made therein without departing from the true spirit and scope of the invention as defined by the appended claims.

We claim:

1. A method for determining the internal delay time of a transponder of the type adapted to be remotely actuated by a first receive signal and to generate a first transmit signal in response thereto comprising
   detecting said first receive signal at a first point in the internal signal path of said transponder,
   converting a portion of said first transmit signal to the frequency of said first receive signal thereby generating a second receive signal,
   detecting said second receive signal at said first point in the internal signal path of said transponder,
   measuring the elapsed time between the detection of said first receive signal and the detection of said second signal; transmitting a signal indicative of said elapsed time.

2. The method of claim 1 wherein converting a portion of said first transmit signal to the frequency of said first receive signal comprises
   mixing said first transmit signal with a third signal having a frequency such that the output frequency of said mixer is equal to the frequency of said first receive signal.

3. The method of claim 1 wherein measuring the elapsed time between the detection of said first receive signal and the detection of said second signal comprises measuring the phase angle between said first and second signals.

4. The method of claim 3 wherein measuring the phase angle between said first and second signals comprises
   setting a local oscillator to be in phase with said first signal,
   comparing the phase of said local oscillator with said second receiver signal.

5. The method of claim 4 further comprising
   converting the phase difference between said first and second received signals to a coded signal indicative thereof.

6. The method of claim 5 wherein transmitting said signal comprises
   modulating said transmitted signal with said coded signal.

7. A method for determining the internal delay time of a transponder of the type adapted to generate a first transmit signal in response to a first receive signal comprising:
   detecting said first transmit signal, generating a second receive signal in response to said first transmit signal, said second receive signal characterized by a frequency the same as said first receive signal whereby said transponder generates a second transmit signal delayed in time from said first transmit signal by said delay time of said transponder,
   measuring the time between said first and second transmit signals and transmitting a signal indicative of said time.

8. The method of claim 7 wherein generating a second receive signal comprises
   mixing said first transmit signal with a local oscillator signal having a frequency such that the output frequency of said mixer is equal to the frequency of said first receive signal.

9. An automatic transponder of the type adapted to generate a first transmit signal in response to a receive signal comprising
   antenna means,
   receiver means coupled with said antenna means for receiving said receive signal at a first radio frequency and generating an output responsive thereto,
   transmitter means coupled with said antenna means operative to generate a transmit signal at a second radio frequency,
   means coupled with said receiver means adapted to activate said transmitter means in response to said output of said receiver means,
   means coupled with said antenna means for generating a second receive signal at said first radio frequency in response to said first transmit signal whereby said transponder generates a second transmit signal delayed in time for said first transmit signal by the internal time delay of the transponder; and means for inhibiting said transponder from generating a third transmit signal in response to said second transmit signal.

10. The automatic transponder of claim 9 wherein said means coupled with said antenna means for generating said second receive signal at a first radio frequency comprises:
    mixer means having first and second input terminals, and an output terminal, said first input terminal coupled with said antenna means for receiving said first transmit signal, and said second terminal connected to a local oscillator having a frequency such that the output frequency of said mixer is equal to said first radio frequency, and said second output terminal coupled with said antenna means.

11. An automatic transponder of the type adapted to generate a first transmit signal at a first radio frequency in response to a receive signal at a second radio frequency comprising:
    antenna means,
    receiver means, coupled with said antenna means, operative to generate a first output signal responsive to said first receive signal,
    transmitter means coupled with said antenna means for selectively generating said first transmit signal,
    means responsive to said first output signal for actuating said transmitter means when said first output signal is present,
    means coupled with said antenna means responsive to said first transmit signal for generating a local second receive signal having the same frequency as said first receive signal, said local second receive signal operative to generate a second output signal at said receiver means, timer means operatively associated with said receiver means to measure the time between said first and second output signals; and means coupled with said timer and with said transmitter means for transmitting a signal indicative of said time between said first and second output signals.

* * * * *